No. 867,865.
PATENTED OCT. 8, 1907.
A. A. YACKEE.
HARROW ATTACHMENT FOR CULTIVATORS.
APPLICATION FILED AUG. 27, 1906.
2 SHEETS—SHEET 2.
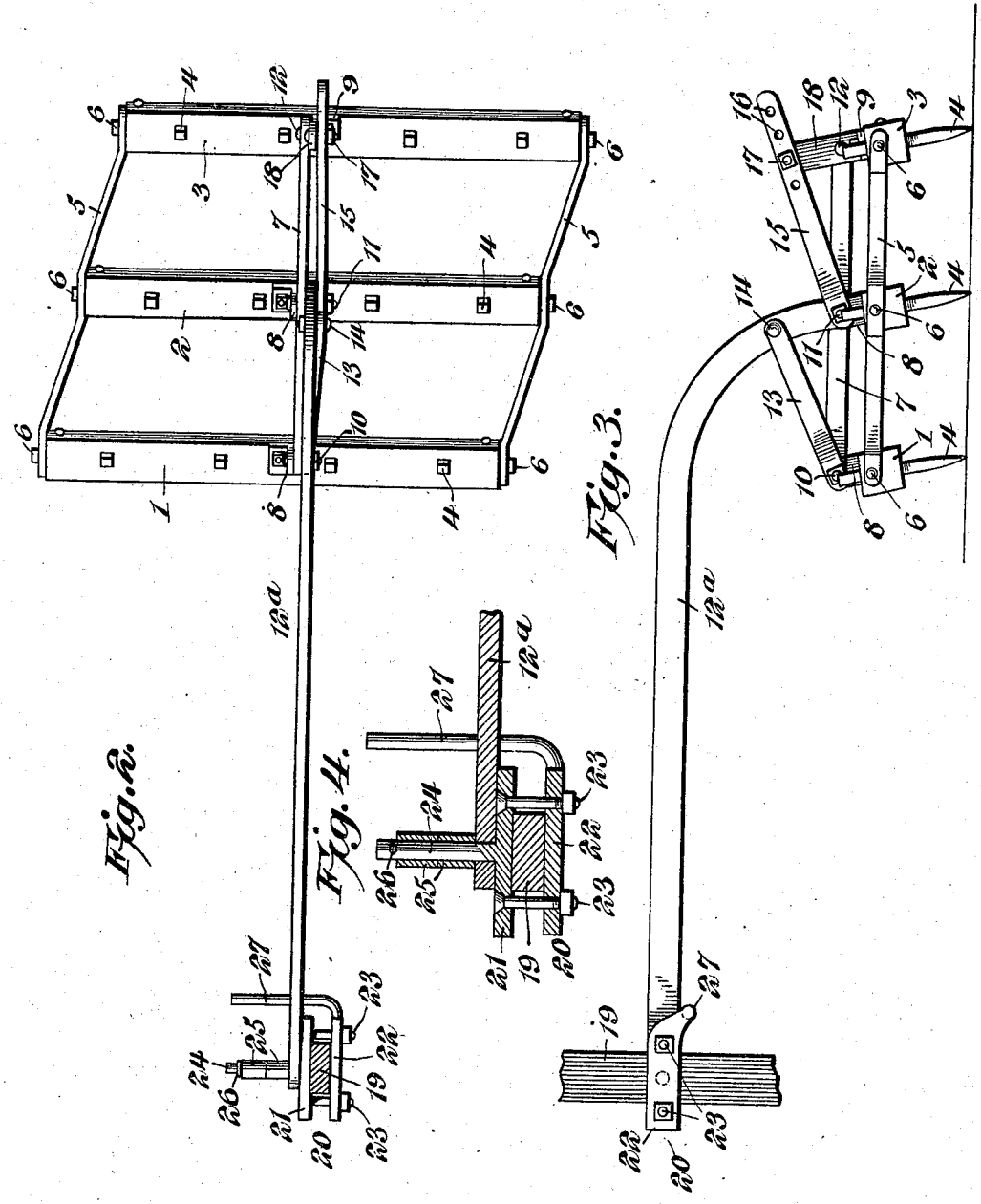
Witnesses
Howard D. Orr.
H. J. Riley
Inventor,
August A. Yackee,
By E. J. Siggers.
Attorney

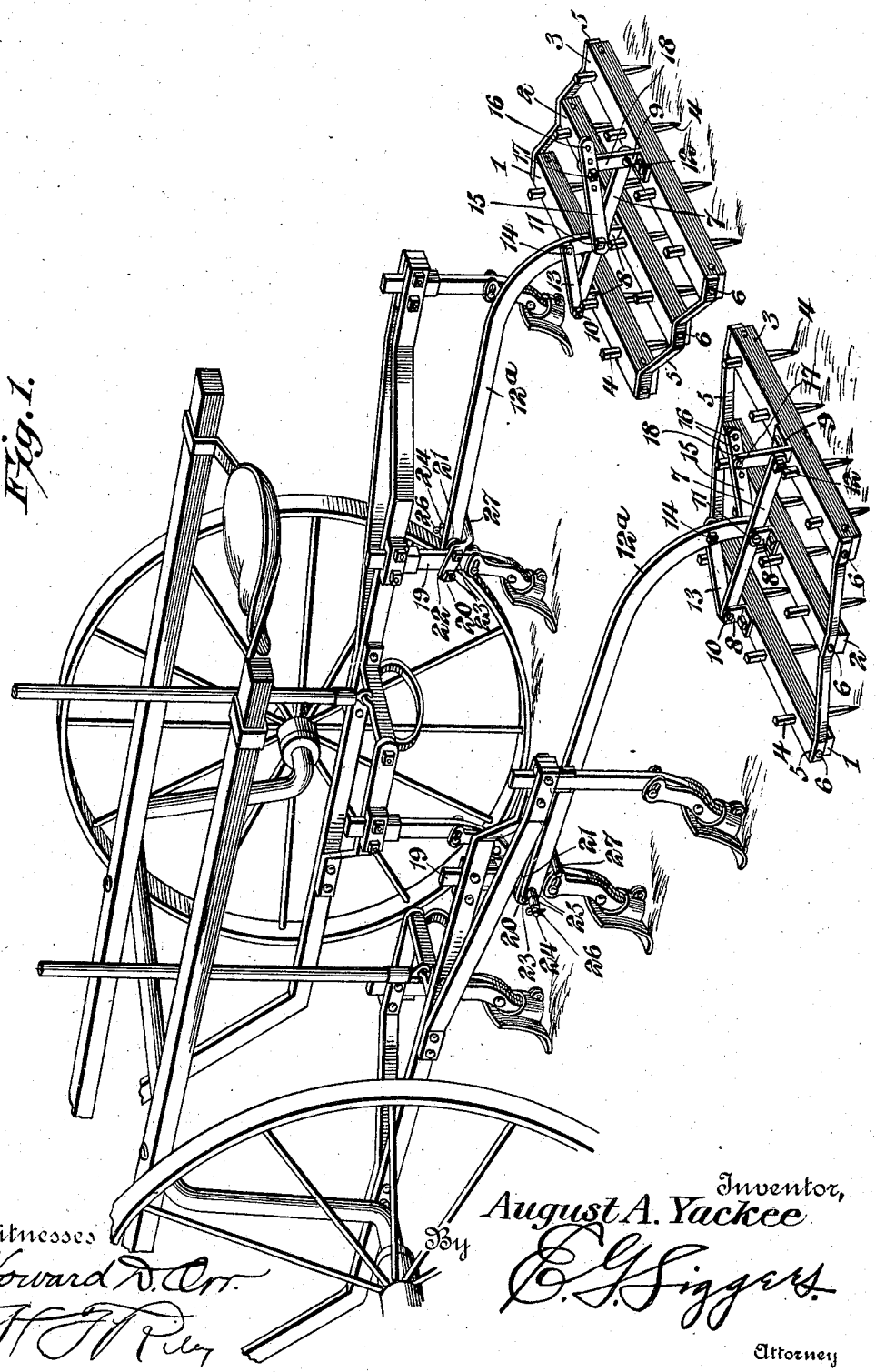

UNITED STATES PATENT OFFICE.

AUGUST A. YACKEE, OF ROBERTS, ILLINOIS.

HARROW ATTACHMENT FOR CULTIVATORS.

No. 867,865.  Specification of Letters Patent.  Patented Oct. 8, 1907.

Application filed August 27, 1906. Serial No. 332,160.

*To all whom it may concern:*

Be it known that I, AUGUST A. YACKEE, a citizen of the United States, residing at Roberts, in the county of Ford and State of Illinois, have invented a new and useful Harrow Attachment for Cultivators, of which the following is a specification.

The invention relates to improvements in harrow attachments for cultivators, planters, and other farm implements.

The object of the present invention is to improve the construction of harrow attachments, and to provide a simple and comparatively inexpensive harrow attachment of great strength and durability, adapted to be readily applied to a cultivator, planter, or other farm implement, and designed to be arranged in rear of the shovels of a cultivator to level and loosen the ground, break up large clods, tear up weeds and rake the same to the surface, and to uncover any corn that may have been covered while plowing.

A further object of the invention is to provide a harrow attachment of this character, adapted to be arranged to run on the corn, the first time the same is cultivated, and capable of adjustment to run close to the sides of the rows when the corn grows too high for the harrow attachment to run over it.

Another object of the invention is to enable the harrow attachment to be adjusted simultaneously with the beams of a cultivator, and also to be swung up independently of the cultivator beams, should the harrow attachment become clogged.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a harrow attachment constructed in accordance with this invention and shown applied to a cultivator. Fig. 2 is a plan view of one of the harrow sections, the standard of the cultivator beam being in section. Fig. 3 is an enlarged side view of one of the harrow sections. Fig. 4 is an enlarged detail sectional view, illustrating the construction for securing the harrow sections to the standards of a cultivator.

Like numerals of reference designate corresponding parts in all the figures of the drawings.

The harrow attachment is composed of two harrow sections, which are adjustable laterally toward and from each other to arrange the harrow sections so as to run over the corn, when the same is first cultivated, and also to enable the harrow sections to be spaced apart to run close to the sides of the rows as the corn grows too high to be run over by the harrow sections. Each harrow section is composed of a plurality of transversely disposed tooth bars 1, 2 and 3, which may be constructed of any suitable material and which may be of any desired number to construct the harrow section of the desired size.

The tooth bars, which are provided at regular intervals with harrow teeth 4, are arranged out of alinement and at different distances from the longitudinal median line of the cultivator to set the harrow teeth in staggered relation. The intermediate tooth bar 2 is arranged nearer the median line of the cultivator than the front tooth bar 1, and the rear tooth bar is located closer to the median line than the intermediate tooth bar. The said tooth bars are connected at their terminals by diagonally arranged side bars 5, secured to the ends of the tooth bars by suitable pivots 6, and angularly bent between the tooth bars to correspond with the position of the ends of the said tooth bars. The side bars 5 form guards, and prevent the ends of the tooth bars from coming in contact with and injuring the corn. In the accompanying drawings the tooth bars are constructed of wood, and the pivots 6 preferably consist of large wood screws.

The tooth bars are pivotally connected with a longitudinal bar or member 7 by means of angle plates or pieces 8 and 9, secured to the upper faces of the tooth bars and having upwardly extending portions, which are pierced by bolts 10, 11 and 12, or other suitable pivots for securing the said upwardly extending portions to the bar or member 7. The intermediate bolt 11 secures the longitudinal bar or member 7 to the rear end of a beam $12^a$, which is also connected with the front end of the bar or member 7 by a brace 13. The brace is secured at its front end to the angle plate of the front tooth bar 1 by the bolt 10, and the brace extends upwardly and rearwardly, its rear end being secured to the beam 12 by a bolt 14. The brace maintains the longitudinal bar or member 7 in fixed relation with the beam 12. The pivotal connection of the angle plates or pieces 8 and 9 permit the tooth bars to swing upwardly and rearwardly to arrange the harrow teeth either vertically or at an inclination. The harrow teeth are secured in their adjustment by means of a rear adjusting bar or brace 15, arranged in substantial parallelism with the front brace 13, and secured at its lower or front end to the beam by the intermediate pivot bolt 11. The rear brace 15 is provided at its upper or rear portion with perforations 16, arranged at intervals and adapted to receive a bolt 17 for securing the adjusting bar or brace 15 to the upper end of the rear angle plate or piece 9, which is extended above the bar or member 7 to provide an arm. The arm 18 is adapted to be swung backwardly and forwardly to adjust the harrow teeth; the bolts 10, 11 and 12 form the pivots for such adjustment, and the tooth bars 1, 2 and 3 are simultaneously moved through the connecting side bars 5.

The beam 12 of each harrow section extends forwardly and it is connected with the intermediate standard 19 or other part of the cultivator beams by means of a clamp 20, composed of opposite plates or members 21 and 22, which are pierced by bolts 23 for securing the plates or members to the standard at the opposite side faces thereof. The heads of the bolts are counter-sunk in the plate or member 21, so as not to interfere with the upward and downward swinging movement of the beam, and the nuts of the bolts are arranged to engage the other plate or member 22, as clearly shown in Fig. 4 of the drawings. The plate or member 21 is provided with a laterally extending pivot 24, which receives the front end of the beam 12, and which extends through an eye or opening of the same. The pivot also receives a plurality of sleeves 25, which may be of any desired length and of any desired number, and which are retained on the pivot by means of a key 26, or other suitable fastening means. The beam 12 is adapted to be arranged against the outer plate or member 21, as shown in Fig. 4, and one or both of the sleeves 25 may be interposed between the beam and plate 21. This construction permits the harrow sections to be adjustable laterally toward and from each other.

The inner plate or member 22 is provided with a lateral extension, consisting of a stud 27, located at the rear end of the plate or member 22, and extending outwardly across the rear end of the clamp and beyond the outer plate or member 21, and adapted to form a support or stop for the beam 12 to limit the downward movement thereof. The transversely disposed stud 27 is of a length to be engaged by the beam 12 in any lateral adjustment of the same.

The harrow beams extend rearwardly beyond the rear ends of the cultivator beams, and the harrow sections are located in rear of the shovels of the cultivator beams.

When the harrow beams are supported by the studs 27 of the clamps, the harrow attachment will be adjusted simultaneously with the cultivator beams, when the latter are raised or lowered, and the pivotal connection between the harrow beams and the standard, will permit the harrow sections to be swung upwardly independently of the cultivator beams should the harrow sections become clogged. This independent upward swing of the harrow attachment may be effected by the feet of the operator, as the harrow attachment will be light enough to permit it to be swung upward in this manner.

Having thus fully described my invention, what I claim as new and desire to secure by Letters Patent, is:—

1. In a harrow attachment, the combination with cultivator beams provided with shovels, of harrow beams extending rearwardly beyond the cultivator beams, harrow sections located in rear of the shovels and mounted on the lower ends of the harrow beams, and means for connecting the harrow beams with the cultivator beams and for adjusting the harrow sections laterally toward and from each other.

2. In a harrow attachment, the combination with cultivator beams provided with shovels, of harrow beams extending rearwardly beyond the cultivator beams, harrow sections located in rear of the shovels and mounted on the lower ends of the harrow beams, and means for hinging the harrow beams to the cultivator beams and for adjusting the harrow sections laterally toward and from each other.

3. In a harrow attachment, the combination with cultivator beams provided with shovels, of harrow beams connected with the cultivator beams and extending rearwardly beyond the shovels, and harrow sections mounted on the rear ends of the harrow beams and comprising a plurality of pivotally mounted tooth bars provided with harrow teeth, and diagonally arranged side bars located at opposite sides of the harrow sections and pivotally connected with the tooth bars beyond the pivotal points thereof.

4. A harrow attachment comprising a beam, a relatively fixed bar or member, a plurality of tooth bars pivotally connected with the said bar or member and provided with harrow teeth, said tooth bars being located at different distances from the longitudinal center to arrange the teeth in staggered relation, angularly bent side bars pivotally connected to the ends of the tooth bars, and means for adjusting the tooth bars.

5. A harrow attachment comprising a beam, pivotally mounted harrow bars carried by the beam, one of the bars being provided with a projecting arm, means located below the pivotal points of the tooth bars and connecting the same to cause the tooth bars to swing in unison, and means connected with the said arm for securing the tooth bars in their adjustment.

6. A harrow attachment comprising a beam, a relatively fixed bar or member secured to the beam, harrow bars provided with upwardly projecting plates or pieces pivoted to the fixed bar or member, one of the plates or pieces being extended to form an arm, means for connecting the tooth bars to cause the same to swing in unison, and means connected with the said arm for securing the tooth bars in their adjustment.

7. A harrow attachment comprising a beam, a relatively fixed bar or member secured to the beam, harrow bars provided with upwardly projecting plates or pieces pivoted to the fixed bar or member, one of the plates or pieces being extended to form an arm, means for connecting the tooth bars to cause the same to swing in unison, and a bar or brace connected with the beam and provided with adjustable means for connecting it with the said arm.

8. A harrow attachment comprising a beam, a relatively fixed bar or member secured to the rear end of the beam and extending in advance and in rear of the same, a front brace extending from the front end of the bar or member to the beam, a plurality of tooth bars pivotally connected with the said bar or member, the rear tooth bars being provided with an upwardly extending arm, means for connecting the tooth bars, and a rear adjusting bar or brace extending from the beam to the said arm and provided with means for adjustably engaging the same.

9. A harrow attachment comprising a clamp adapted to engage a standard or other portion of a cultivator or other machine and provided with a pivot, a harrow section having a beam connected with the pivot, and means carried by the cultivator and located beneath and arranged to support the harrow beam for adjusting the attachment simultaneously with the cultivator, said harrow beam being also adapted to be swung upwardly from the supporting means to adjust it independently of the cultivator.

10. In a harrow attachment, the combination with cultivator beams having shovels, harrow beams extending rearwardly beyond the shovels, harrow sections mounted on the beams and located in rear of the shovels, clamps connected with the cultivator beams and having laterally extending pivots receiving the harrow beams, and means for adjusting the harrow beams laterally on the said pivots.

11. A harrow attachment comprising a harrow section having a beam, a clamp provided with a pivot receiving the beam, and removable sleeves also arranged on the pivot and adapted to be placed on either side of the beam for adjusting the same laterally.

12. A harrow attachment comprising a harrow section having a beam, a clamp having a pivot receiving the beam, and means also carried by the clamp and located below the beam for supporting the same.

13. A harrow attachment comprising a harrow section having a beam, a clamp having a pivot receiving the beam, and a laterally extending stud carried by the clamp and located below the beam.

14. A harrow attachment comprising a beam section having a beam, and a clamp composed of two adjustable plates or members, one of the plates or members being provided with a pivot receiving the beam, and the other plate or member having a lateral stud arranged to support the beam.

In testimony, that I claim the foregoing as my own, I have hereto affixed my signature in the presence of two witnesses.

AUGUST A. YACKEE.

Witnesses:
JOHN SAWYER,
J. SMITH.